(Model.)
F. A. BROWNELL.
PHOTOGRAPHIC SHUTTER.
No. 537,916.　　　　　　　　　　Patented Apr. 23, 1895.
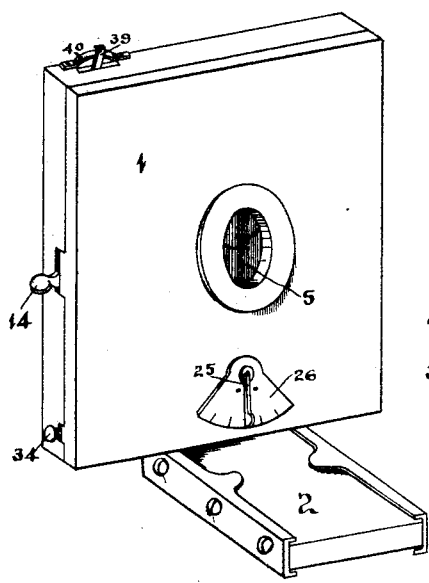
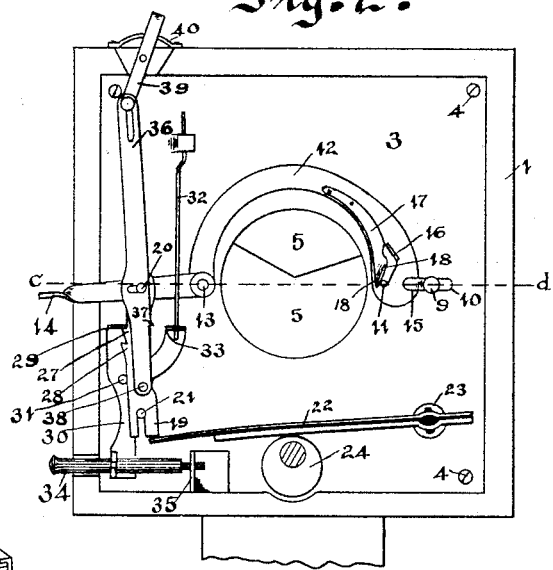
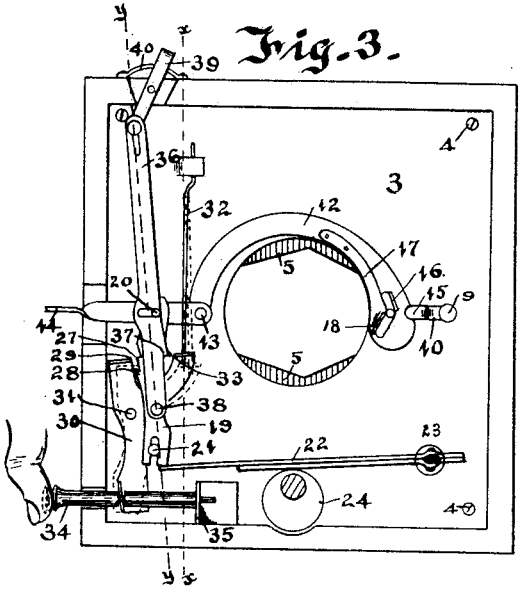
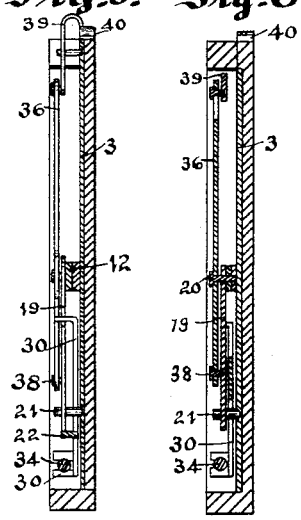
Witnesses:
Thomas Durant
Wallace Murdock
Inventor.
Frank A Brownell
by Church & Church
his Attorney.

(Model.)
2 Sheets—Sheet 2.
F. A. BROWNELL.
PHOTOGRAPHIC SHUTTER.
No. 537,916.   Patented Apr. 23, 1895.
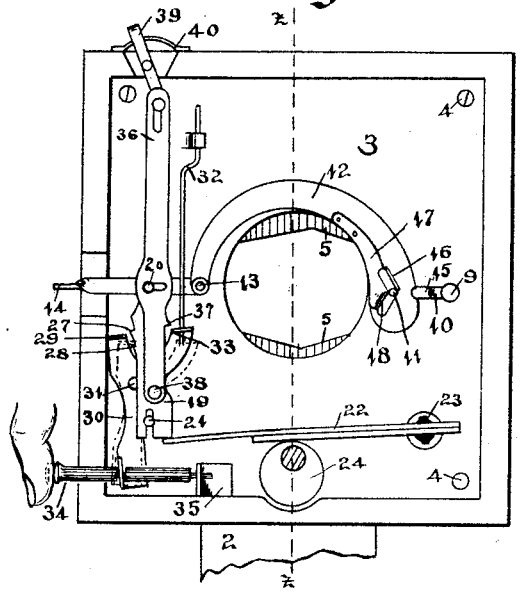
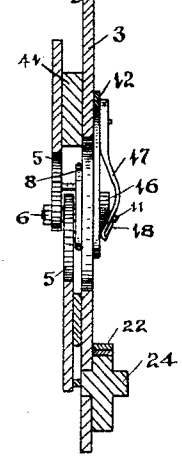
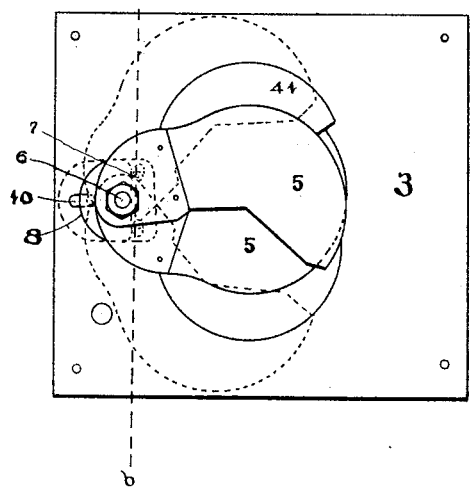
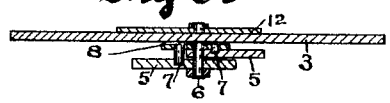
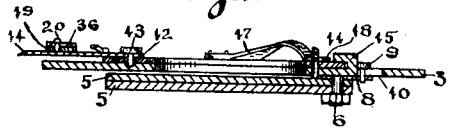
Witnesses:  
Thomas Durant  
Wallace Murdock  
Inventor.  
Frank A. Brownell  
by Church & Church  
his Attorneys

UNITED STATES PATENT OFFICE.

FRANK A. BROWNELL, OF ROCHESTER, NEW YORK, ASSIGNOR TO THE EASTMAN KODAK COMPANY, OF SAME PLACE.

PHOTOGRAPHIC SHUTTER.

SPECIFICATION forming part of Letters Patent No. 537,916, dated April 23, 1895.

Application filed January 25, 1894. Serial No. 498,044. (Model.)

*To all whom it may concern:*

Be it known that I, FRANK A. BROWNELL, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention has for its object to provide an improved photographic shutter of that class which is adapted to be set for instantaneous exposure without opening the lens aperture, and hence particularly adapted for use in cameras employing film in continuous lengths, or in magazine cameras, in which the use of a screen for covering the sensitive surface during the setting operation is dispensed with, and to these and other ends it consists in certain improvements in construction and combinations of parts, all as will be hereinafter fully described and the novel features pointed out particularly in the claims at the end of this specification.

In the drawings: Figure 1 is a perspective view of a shutter constructed in accordance with my invention; Fig. 2, a front view with the casing cover removed showing the parts ready for an instantaneous exposure; Fig. 3, a similar view showing the shutter open during an instantaneous exposure; Fig. 4, a similar view showing the shutter being set for a time exposure; Fig. 5, a section on the line $x-x$ of Fig. 3; Fig. 6, a section on the line $y-y$ of Fig. 3; Fig. 7, a section on the line $z-z$ of Fig. 4; Fig. 8, a rear elevation with the shutters open in dotted lines; Fig. 9, a section on the line $a-b$ of Fig. 8; Fig. 10, a section on the line $c-d$ of Fig. 2.

Similar reference-numerals in the several figures indicate similar parts.

In the present embodiment of my invention I have shown the shutter inclosed within a suitable casing 1 formed with a foot 2 at its lower end adapted to slide upon and be secured to a suitable camera bed, such as shown, for instance, in my prior patent, No. 442,216, and arranged within this casing is a plate or support 3 on which the operating parts of the shutter are mounted; said plate being preferably constructed of metal, and secured within the casing by suitable screws 4. Upon the rear side of the plate 3 are mounted the two overlapping shutter wings or blades 5 pivoted upon a stud 7 and having their inner sides preferably formed as shown in such manner that the lens opening, which of course coincides with the aperture formed in the supporting plate and casing, will be opened and closed at the center. Each of the shutter wings or blades is provided near the pivotal point with a pin 7; said pins operating in slots in a small slide or plate 8 sliding on the main supporting plate and held in position thereon by a headed pin 9 passing through a slot 10 and also by the shutter wings. To this slide is also secured an actuating projection or pin 11 also operating through a slot in the supporting plate 3. The pins on the shutter wings or blades and the slots in the slide 8 are so arranged relatively that the movement of the plate toward the lens aperture will cause the shutter wings or blades to be opened and a movement in the opposite direction will cause them to be closed. A stop plate 41 arranged on the rear side of the support 3 is adapted to engage one of the shutter wings 5 and prevent excessive movement.

The means for actuating the slide 8, consists of a movable plate 12, constructed in the present instance in the form of a lever, extending preferably on opposite sides of the lens opening, pivoted at 13 to the support 3 and having its end 14 extended to the outside of the casing to form an actuating handle. The inner end of this lever 12 is guided on the support 3 by a tongue 15 struck up in forming the slot 10, and it is also slotted and provided with an inclined shoulder or edge 16 arranged to co-operate with the pin 11 on the slide 8, for actuating said plate in a direction to close the shutter wings. The end of the pin 11 is preferably beveled to one side, as shown, and arranged upon the actuating plate 12 is a spring latch 17 having a shoulder 18 at its end arranged at an angle to the shoulder 16 on the lever; said operating shoulders or edges and pin 11 being so relatively arranged with regard to the lever plate 12 that when the latter is in the position shown in Fig. 2 and the shutter set for operation the shoulder or edge 18 will engage the pin, and when said lever is moved down, will slide said pin and the slide 8 to the right, opening the shutter wings and then as the lever continues its movement the shoulder 16 will actuate said pin in the opposite direction closing the shutter. When the plate 12 is raised again, the beveled end of the pin 11 will move under the end of the latch 17 without causing the movement of the shutter wings, raising the latch, which latter will drop behind said pin and in position to cause the shoulder 18 to move the latter when the plate 12 is again moved.

It will be noted that the side of the slot opposite the shoulder 18 on the latch will prevent the sliding plate 8 from moving too far or too rapidly when the plate 12 is actuated thereby better controlling the movement.

It is of course immaterial whether the shoulders 16 and 18 be turned up as shown, as the edges of the plates would perform the same functions, but where the parts are of sheet metal, I prefer the arrangement shown. I also prefer to make the plate 12 in the form of a lever, pivoted, as shown, for convenience in operation and also in order that considerable movement may be given the end of the lever carrying the latch and causing the operation of the shutter without moving the operating end 14 too far, but I do not desire to be confined to this construction of parts.

As a means for causing the movement of the lever 12 in a direction to open and close the shutter, I provide a movable catch plate 19 pivoted at 20 to said lever and having its lower end guided upon a pin 21, the head of which also serves to prevent its outward movement, and the actuating spring 22 engages the end of this plate being secured to a post 23 and an adjustable cam 24 being provided for regulating the tension. The shaft of said cam is provided with a spring arm 25 on the outside of the shutter casing co-operating with depressions formed in a segmental plate 26, and having suitable indicia thereon for indicating the amount of tension under which the spring is placed. The catch plate 20 is provided on one side with two teeth or projections 27 and 28 with one or the other of which is adapted to engage a shoulder or projection 29 formed by turning up the end of a detent lever 30 pivoted at 31 to the support; said detent being actuated in one direction by a spring 32 secured to the support 3. The detent lever 30 is also provided with a shoulder 33 arranged opposite the projection 29, and is adapted to be actuated in a direction to release the catch plate by a pin 34 slotted to engage the slotted end of said lever and guided in an ear 35 struck up from the plate 3, as shown.

From the above it will be understood that when the operating end 14 of the lever 12 is pressed down to the position shown in Fig. 1, the shoulder 27 on the catch plate will be engaged by the projection 29 on the detent and upon pressing on the pin 34 said catch plate will be released and the spring 32 will cause the inner end of the lever 12 to move downward operating the wings of the shutter and opening the lens aperture from, and closing it toward the center, as before described, and the time of this exposure can be regulated by adjusting the tension of the spring 32 as will be understood.

In order that time exposures may be made and the lens aperture opened and maintained opened for any desired length of time I pivot upon the catch plate 26 at 38 an arm 36 having a tooth or projection 37 thereon arranged substantially between the projections 27 and 28 on the opposite side and guided by the pin 20, which also constitutes the pivot between the catch plate and the lever 12. The upper end of this arm 36 is slotted and in this slot projects the end of an indicating and actuating device, as shown, as a small lever 39 pivoted to the shutter support or to the casing, having its outer end bent over and co-operating with a plate 40 located on the outside of the casing and having two marks thereon for indicating the position of the lever. When the lever is moved to one position, the arm 36 is maintained in the position shown in full lines Figs. 2 and 3, and the projection 37 thereon is inoperative, but when it is desired to make a time exposure, that is, to arrest the lever 12 at half stroke, the lever 39 is turned to the position shown in full lines in Fig. 4 causing the movement of the projection 37 outward so that when the parts are as in Fig. 2, and the pin 34 is pushed in, the catch plate will be released, but instead of moving its full stroke the projection 37 will engage the stop 33 on the detent lever, as shown in full lines in Fig. 4 and upon releasing the pressure on the pin 34, the projection 29 on the detent lever 30 will engage the projection 28 on the catch plate, as shown in dotted lines, arresting the operating lever 12 at half stroke, leaving the shutters open as shown in said figure. The time exposure can now be made in the ordinary way by the use of a cap, or the lens may be opened by the cap and the exposure terminated by pressing upon the pin 34 and causing the release of the catch plate allowing the shoulder 16 on the lever 12 to close the shutter.

In the claims I have used the term "pin" to designate the projection 11 on the movable plate 8, but a shoulder or projection of any nature co-operating with a plate and latch in substantially the same way and accomplishing the same result would obviously be within my invention, and I therefore do not desire to be confined particularly to an actuating projection in the form of a pin.

I claim as my invention—

1. A photographic shutter embodying movable light intercepting media, adapted to cover and uncover a lens aperture, in combination with a movable pin controlling the movement of said media, a movable plate having an operating edge or shoulder and a spring latch thereon having an operating edge or shoulder, both said operating shoulders adapted to engage the pin successively and cause its positive operation in both directions, substantially as described.

2. In a photographic shutter, the combination with two shutter wings and a movable pin causing their positive operation to open and close a lens opening, of the movable plate having an operating edge or shoulder, and a spring latch thereon having an operating edge or shoulder and yielding in a plane at right angles to the plane of movement of the plate, said shoulders arranged at an angle to each other and adapted to engage the movable pin, substantially as described.

3. In a photographic shutter, the combination with two shutter wings and a movable pin for causing their positive operation to open and close a lens aperture, of the movable plate having an operating edge or shoulder and a spring latch thereon yielding in a plane at right angles to the movement of the plate and also having an operating edge or shoulder, said shoulders arranged to actuate the pin in opposite directions when the plate is moved in one direction, and a motor device for moving said plate, substantially as described.

4. In a photographic shutter, the combination with two shutter wings and a movable projection for causing their positive operation to open and close a lens aperture, of the movable plate having an operating shoulder and a spring-latch thereon also having an operating shoulder, said shoulders arranged to actuate the projection in opposite directions when the plate is moved in one direction, a spring motor device for actuating the plate and a detent for holding said plate against the motor, substantially as described.

5. In a photographic shutter, the combination with the light excluding media and the movable pin controlling its movement, of the movable plate having the aperture for the projection V-shaped on one side, and the laterally yielding spring-latch on said plate having the operating edge, substantially parallel with one of the sides of said aperture, and means for actuating the plate, as set forth.

6. In a photographic shutter, the combination with the shutter proper and the movable pin controlling its movement, of the movable plate having the operating shoulder the spring-latch thereon having the operating shoulder, the catch plate connected to the movable plate, a detent for retaining it and a spring for operating the movable plate, substantially as described.

7. In a photographic shutter, the combination with the shutter proper, the movable plate for operating it positively in opposite directions and a spring for moving said plate, of the catch plate connected to the movable plate having two projections on one side, the arm movably connected to the catch plate having a projection or shoulder opposite the two projections and the detent having the two projections one adapted to engage the two projections on the catch plate and the other the one on the arm, substantially as described.

8. In a photographic shutter, the combination with the two shutter wings, the slide for actuating them having the pin, the lever having the shoulder, and the spring-latch thereon, both cooperating with said pin, the catch plate connected to the lever, the spring for actuating the lever, and the spring-operated detent engaging the catch plate, as set forth.

9. In a photographic shutter, the combination with the two shutter wings, the slide for actuating them having the pin, the lever having the shoulder, and the spring latch thereon both cooperating with said pin, the catch plate movable with the lever, having the two projections, the movable arm on the catch plate having the projection, and the detent having the two projections, one cooperating with those on the catch plate and the other with the one on the arm, substantially as described.

10. The combination with the support, the shutter wings, and the movable plate for actuating them, of the catch plate having the two projections, connected to said plate, the arm thereon having the projection, the detent having the two projections one operating on the plate and the other on the arm, and a spring for operating it, the indicator on the shutter support connected by a loose connection with the arm on the catch plate for moving it, substantially as described.

11. The combination with the support, the shutter wings and the movable plate for actuating them, of the catch plate on the movable plate, the movable time stop thereon, and the detent cooperating with the plate and stop, and the lever pivoted on the shutter support engaging the end of the time stop by a loose connection, substantially as described.

12. In a shutter, the combination with the casing, two shutter wings connected for simultaneous operation and an actuating pin for operating the shutters positively in opposite directions, of a spring-operated plate engaging the pin and moving the shutters in one direction, the spring latch on the plate engaging said pin and operating the shutters in the opposite direction, and a detent for engaging and retaining the plate against its spring, substantially as described.

FRANK A. BROWNELL.

Witnesses:
FRED F. CHURCH,
G. A. RODA.